Feb. 17, 1942.  P. S. MORGAN  2,273,718
LIQUID METER
Filed Oct. 18, 1940  2 Sheets-Sheet 1

INVENTOR
Porter S. Morgan
BY Albert R Henry
ATTORNEY

Feb. 17, 1942.   P. S. MORGAN   2,273,718
LIQUID METER
Filed Oct. 18, 1940   2 Sheets-Sheet 2

Inventor
Porter S. Morgan
By
Albert R. Henry
Attorney

Patented Feb. 17, 1942

2,273,718

UNITED STATES PATENT OFFICE 2,273,718

LIQUID METER

Porter S. Morgan, Westport, Conn.

Application October 18, 1940, Serial No. 361,757

7 Claims. (Cl. 73—232)

This invention relates to meters for measuring liquid volumes, and it has particular reference to a meter effective to measure accurately liquids, such as gasoline, which are dispensed intermittently and under varying flow rates.

The retail dispensing of gasoline is commonly effected by means of a motor driven pump, whose effluent is delivered through a hose having a valved nozzle at its end. The gasoline, after leaving the pump, passes through a flow meter whose operating mechanism is connected to a register or counter, to show the number of gallons so dispensed. A present type of counter, commonly called a computer, is so devised as to indicate both the number of gallons and the total price thereof, this last indication being obtained by suitable mechanism in the computer, and which is adjustable in order to correlate the price indication to variations in the unit price per gallon.

Such computers, directly connected to the flow meter, impose a significant torque load on the meter itself, and therefore necessitate the use of a meter capable, under the flow rates encountered, of developing sufficient power to drive the computer mechanism while concurrently maintaining its metering, or volume-responsive function. It has therefore been found expedient to employ piston types of meters, wherein losses due to the work imposed on the meter may be minimized by packings or the like.

Such meters are open to certain objections in the way of initial cost and service difficulties, and, were it not for the conflicting duties imposed by the computer load, they would be replaced, to a large extent, by simpler and less expensive flow meters, for example, of the rotary vane or nutating disc type. This type, while readily responsive to liquid flow, loses its effectiveness as a measuring element when the torque load imposed thereon becomes appreciable: to the extent that the meter must operate as a motor, is loses its function as a true meter.

According to the present invention, there is devised a liquid meter wherein the last named type of metering element may be employed, if desired, as a driving device for counters having a high resistance, and wherein the metering function as such is removed from the driving member, and is performed by a second flow responsive element not connected to the counter. The second element, being free running, thus may respond accurately to the liquid flow, and its sole duty, in the course of such response, is to govern a control device, through which the two elements are caused to move in synchronism. The counter thus reflects the liquid volume passing the free running element, rather than the liquid volume which passes through the heavily loaded first, or turbine element.

Stated otherwise, the present invention contemplates two hydraulically operated members, disposed in series, the second of which functions as a meter, and the first of which functions as a turbine or driving means for the computer at a speed which is synchronized to, and therefore reflective of, the liquid volume passing the meter.

In the hereinafter described specific embodiment of the principles of the invention, there is provided a simple form of flow meter through which the pump effluent passes, and which has its movable element directly connected to the counter to drive the same,—thereby, in effect, duplicating the known and inaccurate system of the prior art. The liquid emerging from such member is not, however, permitted to flow directly to the delivery hose, but it is first made to flow through a second similar member, and which, in this invention, constitutes the real meter, as distinguished from the first member which, because of its functioning as a turbine, loses its efficacy as a flow meter. The second flow member, which is not connected to the counter at all, is free running, and its accurate reflection of the delivered volume is transmitted to the counter, by means of a differential gear train interposed between the two hydraulically responsive members.

If there should be any speed differential between the turbine and the meter, as there normally should be because of the difference in loads imposed, such differential will cause the operation of the gearing, and this effect is utilized to open or close, as the case may require, a valve in a vent or bleed line connected to the liquid path between the turbine and meter. Volumes of gasoline may, therefore, be diverted from the meter before passing therethrough, and, since the opening or closing of the valve will continue until the turbine and meter run in synchronism, the ultimate result is that the differential gearing functions, under the control of the meter, to produce such synchronism. The turbine, which is directly connected to the counter, accordingly is made to operate at the same equivalent speed as the meter, and therefore the counter reflects accurately the volume which actually passes the unloaded meter element.

The invention, and the advantages to be derived from the practice thereof, will be more fully understood from the following detailed description of a single embodiment, read in connection with the appended drawings, wherein.

Figure 1:
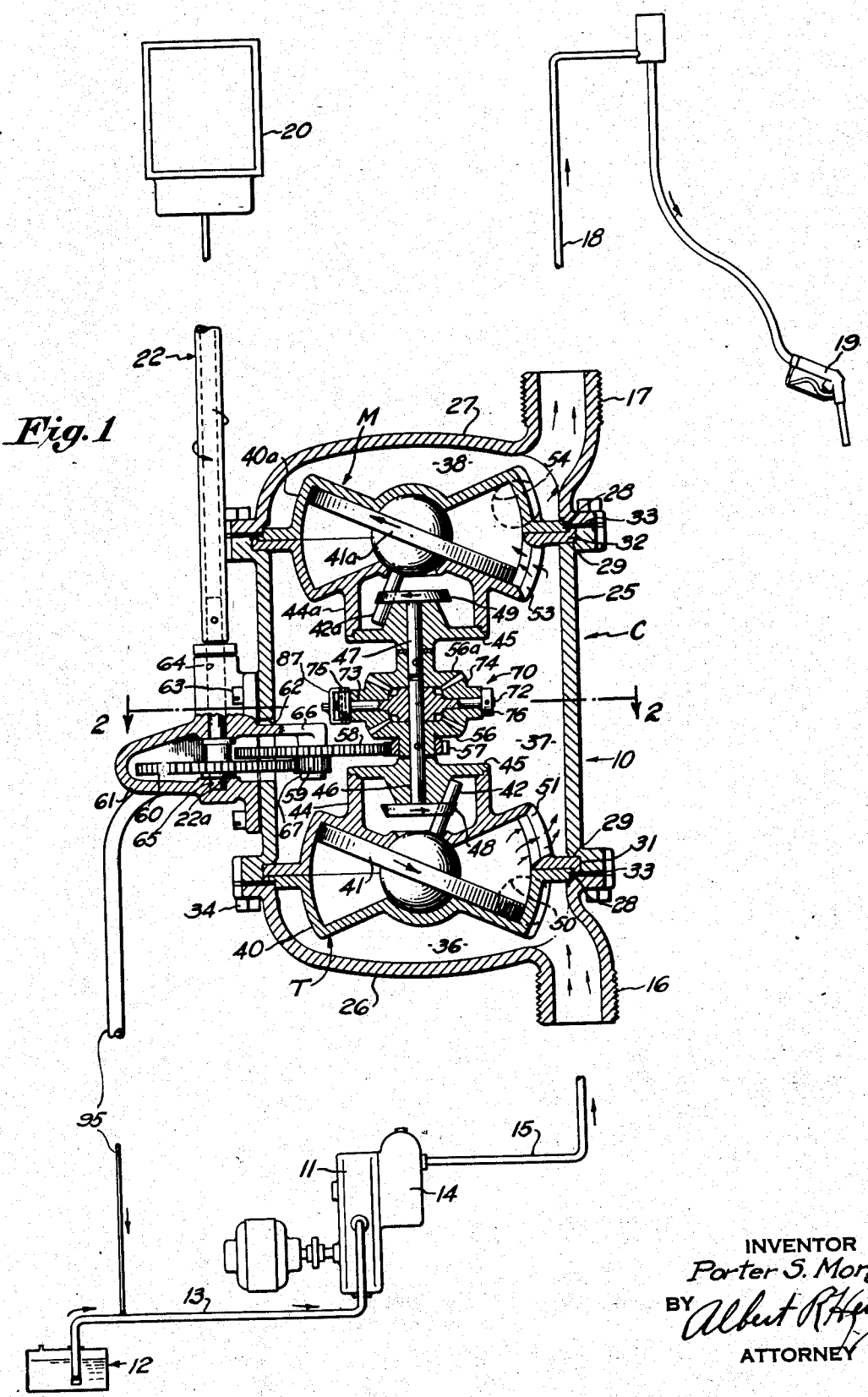
Fig. 1 is a vertical section through a metering unit, with which is diagrammatically illustrated the usual components of a motor driven gasoline dispensing pump assembly.

Referring first to Fig. 1, the novel meter, generally designated by the reference numeral 10, is shown in association with a gasoline dispensing assembly, wherein a motor driven pump 11 draws gasoline from a storage tank 12 through a suction pipe 13, and delivers the liquid to an air separator 14 to effect the elimination of adventitiously included air or other incondensible gas volumes. The liquid, in its gas-free state, is then delivered, under the pressure developed by the pump, into a discharge conduit 15 which is connected to an inlet fitting 16 of the meter 10. The liquid, after flowing through the meter unit, flows therefrom into a discharge line 18, suitably connected to the outlet fitting 17 of the meter. The line 18 terminates in a flexible hose having a valved nozzle 19 at the end thereof, by means of which the service station attendant may readily control the amount of liquid dispensed. The amount of dispensed gasoline is indicated by a counter 20 connected to the meter unit 10 through a shaft 22.

The metering unit 10 includes a casing C consisting of a cylindrical body 25, whose open ends are capped by lower and upper heads 26 and 27, each respectively provided with one of the above mentioned fittings 16 and 17. The heads and the body are internally shouldered, as indicated by the numerals 28 and 29, to receive the peripheral flange portions 31 and 32 of similar hydraulically responsive members T and M. Gaskets 33 are interposed between the parts. When the lower and upper heads 26 and 27 are clamped together, by means of screws 34, the members T and M are securely locked and are sealed within the casing C. This assembly, in effect, divides the casing into an inlet chamber 36, a central or synchronizing chamber 37, and an outlet chamber 38.

The members T and M are preferably, although not necessarily, simple and well known nutating disc type flow meters, and they comprise two-part housings 40, 40a containing suitably mounted discs 41, 41a, respectively. The discs carry axial spindles 42, 42a, so mounted as to project through their respective housings toward the synchronizing chamber 37. The housings are formed with cylindrical extensions 44, 44a, to which are secured caps 45 formed with axial bearings to receive shafts 46 and 47 respectively. Each shaft carries a slotted crank, 48 and 49 respectively, which is engaged by the associated spindle 42 or 42a.

The member T, which will hereinafter be referred to as the turbine, is provided with an inlet port 50, communicating with the chamber 36, and an outlet port 51 which opens into the chamber 37. Similarly, the meter member M is formed with inlet and outlet ports 53 and 54, respectively, communicating with the chambers 37 and 38. It will be observed that the inlet and outlet ports of the turbine and meter are so arranged that the circular liquid flow through the turbine T is counterclockwise, while the flow through the meter M is clockwise, and accordingly, the shafts 46 and 47, which are driven by the respective elements, rotate in opposite directions.

A bevel gear 56 and a pinion 57 are secured to the shaft 46,—the pinion meshing with a gear 58 forming a part of a gear reduction train which also includes the gears 59 and 60. The gear 60 is secured to the lower extremity 22a of the shaft 22 through which the counter 20 is driven. These parts are mounted on, or by means of, a cover plate 61 adapted to be positioned over an opening 62 formed in the wall of the body 25 by means of screws 63. The body of the plate is formed with bearings 64 and 65 for the shaft extremity 22a, and with an internally extending bracket 66, carrying a stud 67 upon which the intermediate gears 58 and 59 are rotatably mounted.

As thus far described, and with the understanding that the nominal volumetric capacity per cycle of the meter M is the same as that of the turbine T, it will be apparent that the actual amount of liquid passing the turbine per cycle is in excess of the actual amount passing the meter. This is, of course, due to the fact that the turbine is under the load imposed by the gear train and the internal resistance of the counter 20. The resulting pressure drop between its inlet and outlet ports, or between the chambers 36 and 37, is therefore positive, while the pressure drop between chambers 37 and 38, on opposite sides of the free running meter, is practically negligible, because the meter has no work to do. Since the "slippage" volume of liquid, or that amount passing the member per cycle in excess of its theoretical capacity, is a function of the pressure drop, the turbine T will have an apparently greater capacity than the meter M, even though the two elements are entirely alike.

The net effect of this condition, if tolerated, would be to cause the meter M to operate at a higher rate of speed than the turbine T, due to the tendency to build up an excess liquid volume in the chamber 37. This effect is herein utilized to govern the operation of the unit, through a control mechanism generally designated by the reference numeral 70.

The control mechanism comprises the above mentioned bevel gear 56, together with a similar bevel gear 56a secured to the shaft 47, and a spider or pinion carrier 72 which is rotatably mounted on the upper extremity of the shaft 46. The spider is formed with pintles 73 which rotatably support pinions 74, meshing with the bevel gears 56 and 56a, and retained in position by thrust collars 75 and 76. The mechanism, as thus described, will be recognized as a common form of differential gearing between two shafts.

Figure 2:
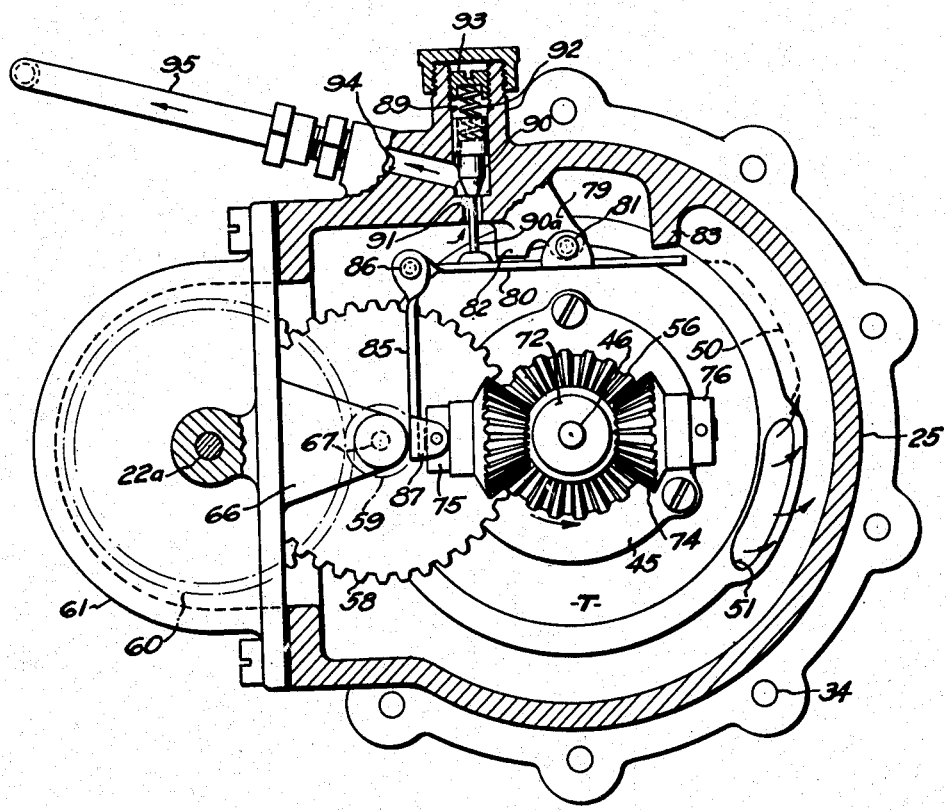
Fig. 2 is a section, on an enlarged scale, on the line 2—2 of Fig. 1.

Referring now more particularly to Fig. 2, it will be seen that a lever 80 is supported on a lug 79 formed on the inner wall of the body 25, and that it is pivotally mounted thereon by means of a stud 81. Stop lugs 82 and 83 are also formed on the inner wall to limit the movement of the lever 80. One end of the lever is pivotally connected to a link 85 by means of a pin 86, and the other end of the link is formed with a yoke 87, which in turn is pivotally connected to the collar 75 of the pinion carrier 72.

The body 25 is also formed with an external bore 89, in which is slidably mounted a valve 90, adapted to seat on a port 91 in communication with the chamber 37. The valve 90 is formed with a stem 90a which projects through the port 91 into contacting engagement with the lever 80. The valve is placed under predetermined load by a spring 92 which is compressed against the outer valve end by means of the adjusting screw 93, which thereby constantly urges the valve towards its seat. The bore 89 is intercepted by a diagonally disposed passage 94, which is connected by a return conduit 95 to a low pressure source, such, for example, as the suction side of the pump 11.

In explanation of the operation of the control mechanism, it will first be recalled that the shafts 46 and 47, respectively driven by the turbine and the meter, rotate in opposite directions. Any difference in speed between them will, therefore, cause motion of the pinion carrier 72, while, on the other hand, if the speeds be the same, the pinion carrier will tend to remain stationary, its pinions simply rotating freely on their own axes. The rotation of the pinion carrier will be, of course, in the same direction as that of the shaft having the greater speed. These effects, inherent in the differential gearing, are employed to assure synchronous operation of the heavily loaded turbine, and the relatively unloaded meter.

The above mentioned tendency of the meter to run faster than the turbine, due to the slippage volume of liquid, accordingly causes the pinion carrier 72 to rotate in the same direction (clockwise) as the meter, and therefore moves the lever 80 against the stem of the valve 90, thus opening the valve. As the valve is opened, however, a portion of the liquid volume in the synchronizing chamber 37 is immediately diverted from the meter inlet, to the suction side of the pump, and therefore, the initially impressed, speed producing force, which caused the overrunning of the meter, is diminished, and the speed is thereupon diminished. This change produces a readjustment of the carrier 72, and therefore a repositioning of the valve 90, and this modulation continues until the valve 90 is open to that degree which permits the meter and the turbine to run at synchronous speeds.

Of course, since the actual flow through the unloaded meter is accurately reflected by the movement of the meter measuring element, and since the turbine operates at the same speed, then the indications produced in the counter 20 are accurate indications of the liquid volume actually dispensed,—which is, of course, the ultimate result sought.

The explanation just made presupposed the nozzle 19 to be open, for otherwise no flow can take place. Let it next be assumed that the attendant closes the nozzle, as he does at the end of a dispensing operation. The meter M is then brought to an abrupt stop, while the turbine T, still able to discharge some small liquid volume through the open port 91, will overrun a few degrees. This action reverses the previously described movement of the pinion carrier, causing the lever 80 to be withdrawn from the stem 90a, and thus permitting the valve 90 to seat tightly. No additional amount of liquid can then enter the bleed line 95, and the slight degree of overrunning is not reflected in the counter itself, due to the compensation incident to the initial starting of the system, and the minimization of the possible error by the gear train reduction.

It may be noted that, while it is advisable to include the limit stops 82 and 83, these come into play only infrequently and under abnormal conditions. The neutralizing action of the throttling valve 90 always acts to limit the motion of the pinion carrier, and thus forestalls any condition of operation of the differential gearing as a driving connection between the turbine and the meter. It may be also noted that, by connecting the vent line 95 to the suction side of the pump, there is established a circuit analogous to those empolyed for reducing, below atmospheric, the low pressure side of a turbine,—a condition which permits operation of the turbine with greater efficiency,—or, what is more important here, greater torque development for driving the counter 22.

Figure 3:
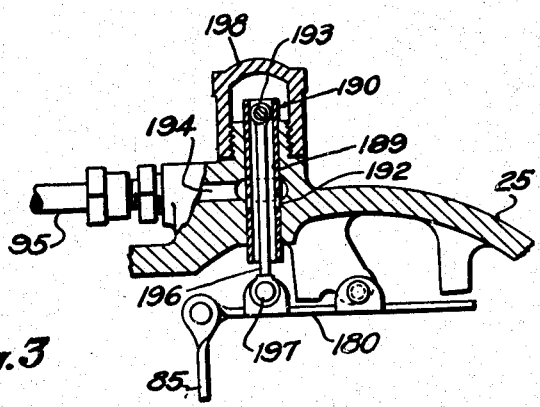
Fig. 3 is a fragmentary sectional view showing a modification of the valve structure illustrated in Fig. 2.

As illustrative of the many modifications which may be made in the specific elements and arrangements of parts shown in the embodiment of the invention, reference may be made to Fig. 3, showing a sleeve valve 190 replacing the spring loaded valve 90. In view of variations in the suction and discharge pressures of the pump 11 in different installations, it may be desirable to forego the use of spring loaded valves in order to safeguard against erroneous field settings of the spring 92, which might thereby impose significant resistance on the meter M.

The bore 89 is accordingly reamed through, as indicated by the reference numeral 189, while the passage 94 is so relocated as to intercept the bore at right angles, as indicated by the numeral 194. The sleeve valve 190 consists of a cylinder formed with transverse openings 192 adapted to be aligned or misaligned with the passage 194 as the cylinder moves in the bore 189.

The valve 190 is operatively connected to the lever 180 by a connecting rod 196, the lower end of which rod is connected to the lever 180 by a pin connection 197, while the upper end is pivotally connected to the valve 190 by a pin 193. An arrangement of this character permits the removal of the valve 190 from the exterior of the unit by the simple operation of removing a sealing cap screw 198 and the pin 193.

It will be understood that while the invention has been described with reference to its utility in the dispensing of gasoline, the novel meter may be employed for other purposes and in other relationships. Accordingly, it is not intended that the invention be limited to the precise details herein described, but that its scope should be deemed commensurate with the following claims.

I claim:
1. A liquid meter comprising a casing formed with inlet and outlet ports, a hydraulically responsive flow member positioned in the casing adjacent the inlet port, a second hydraulically responsive flow member positioned in the casing adjacent the outlet port, said members being spaced in said casing and each being formed with inlet and outlet ports to provide a series passage through said casing and said members, means connected to said first named member adapted to drive a counter, a vent port formed in the casing intermediate said members, a valve for normally closing said port, and differential gearing interposed between said members and connected thereto and to said valve for actuation of said valve in response to asynchronous movement of said hydraulically responsive flow members resulting from flow of liquid through said casing.

2. In a liquid flow meter of the type wherein a hydraulically operable flow responsive member is connected to a counter to drive the same for indicating liquid volumes, a fluid chamber into which effluent from said member is discharged, a pair of hydraulic paths leading from said chamber, a second hydraulically responsive member disposed in one of said paths, a valve for closing the other path, and differential gearing operable by asynchronous movement of said hydraulically operable members for moving said valve.

3. A liquid meter comprising a casing formed with inlet and outlet ports adjacent the ends thereof and a bleed port intermediate said inlet and outlet ports, a hydraulic turbine mounted in said casing adjacent the inlet port, said turbine having an inlet in fluid communication with the inlet port and a discharge opening in fluid communication with the intermediate portion of the casing, a flow meter mounted in said casing adjacent the outlet port thereof, said meter having an inlet in fluid communication with the intermediate portion of the casing and a discharge opening in fluid communication with the outlet port of the casing, the inlets and outlets of said turbine and meter being so disposed with respect to each other as to effect movement in opposite directions of the flow responsive elements thereof, shafts connected to the flow responsive elements of both the turbine and the meter and extending into the intermediate portion of the casing, a driving connection on the turbine driven shaft for operating a counter, a valve for normally closing the bleed port, differential gearing having two of its elements respectively connected to the turbine driven shaft and the meter driven shaft and its third element driven by any speed difference between said first two elements, and means connected to said third element of the differential gearing for operating said valve and thereby opening or closing the bleed port in response to such speed difference.

4. A liquid meter comprising a substantially cylindrical casing having heads on each end thereof, each of said heads being formed with openings constituting main liquid inlet and outlet ports respectively, said casing being formed adjacent its intermediate portion with a bleed port and a gear opening, a cover plate for the gear opening, a counter driving shaft mounted in the plate, reduction gearing mounted on the plate and connected to said driving shaft and extending through the opening into the intermediate portion of the casing, a hydraulic turbine mounted in the casing with an inlet in fluid communication with the said liquid inlet port and with a discharge opening in fluid communication with the intermediate portion of the casing, a shaft driven by said turbine, said turbine driven shaft having mounted thereon a gear meshing with the reduction gearing for driving the counter driving shaft and a gear element of a differential gearing, a flow responsive hydraulic meter mounted in the opposite end of the casing and having its inlets and outlets respectively in fluid communication with the intermediate portion of the casing and the main liquid outlet port, a shaft driven by said meter and having mounted thereon a second gear element of said differential gearing, the third element of said differential gearing being disposed between the said first and second elements for rotative movement within said casing in response to any difference in speed between the first and second elements, a valve for the bleed port, and lever means mounted in the intermediate portion of the casing, and operatively connected to said third element and to said valve, to move the valve upon the occurrence of such speed difference.

5. In a liquid dispensing apparatus, means for supplying liquid under pressure, a counter, a turbine operated by the flow of the liquid under pressure therethrough, means connecting the turbine to the counter to drive the counter, a free running meter receiving liquid emerging from the turbine, a bleed line in fluid communication with the emerging liquid, and means responsive to any speed differential between the meter and the turbine for opening or closing the bleed line.

6. In a liquid dispensing apparatus, means for supplying liquid under pressure, a counter, a turbine operated by the flow of the pressure liquid therethrough, means connecting the turbine to drive the counter, a meter receiving the liquid discharged from the turbine, a bleed line in fluid communication with said discharged liquid, a valve for throttling the bleed line, and differential mechanism having two of its elements connected for operation by the turbine and meter respectively, and its third element connected to change the position of the valve.

7. In a liquid dispensing apparatus, means for supplying liquid under pressure, a counter, a turbine operated by the flow of the pressure liquid therethrough, a driving connection between the turbine and the counter, a free running meter of the same nominal capacity as the turbine receiving the discharge from the turbine, a low pressure source in fluid communication with the turbine discharge, a throttling valve for controlling said last named fluid communication, and means responsive to the respective speeds of the turbine and meter for operating the throttling valve.

PORTER S. MORGAN.